United States Patent
Nakajima

(10) Patent No.: US 10,775,582 B2
(45) Date of Patent: Sep. 15, 2020

(54) LENS UNIT AND MANUFACTURING METHOD OF METAL MOLD

(71) Applicant: NIDEC SANKYO CORPORATION, Nagano (JP)

(72) Inventor: Tomoaki Nakajima, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 96 days.

(21) Appl. No.: 16/228,782

(22) Filed: Dec. 21, 2018

(65) Prior Publication Data

US 2019/0204527 A1 Jul. 4, 2019

(30) Foreign Application Priority Data

Dec. 28, 2017 (JP) ................................ 2017-253532

(51) Int. Cl.
 *G02B 7/02* (2006.01)
(52) U.S. Cl.
 CPC ................................... *G02B 7/021* (2013.01)

(58) Field of Classification Search
 CPC . G02B 7/021; B29C 33/3842; B29D 11/0048; B29D 11/00403
 See application file for complete search history.

(56) References Cited

U.S. PATENT DOCUMENTS

| 7,626,773 | B2* | 12/2009 | Noda | G02B 7/022 359/704 |
| 2019/0187402 | A1* | 6/2019 | Masuzawa | G02B 7/028 |

FOREIGN PATENT DOCUMENTS

JP 2016018182 2/2016

* cited by examiner

*Primary Examiner* — Wen Huang
(74) *Attorney, Agent, or Firm* — JCIPRNET

(57) ABSTRACT

A lens unit includes a plurality of lenses, and a holder in a tube shape which holds the plurality of the lenses. An inner peripheral face of the holder is formed with a plurality of alignment protruded parts protruded from the inner peripheral face to an inner side in a circumferential direction, each of the alignment protruded parts is provided with a first alignment protruded part whose protruding dimension is different and a second alignment protruded part, and the second alignment protruded part is protruded from the first alignment protruded part to the inner side of the inner peripheral face to be abutted with an outer peripheral face of one of the lenses.

10 Claims, 7 Drawing Sheets

LENS UNIT AND MANUFACTURING METHOD OF METAL MOLD

CROSS REFERENCE TO RELATED APPLICATION

The present application claims priority under 35 U.S.C. § 119 to Japanese Application No. 2017-253532 filed Dec. 28, 2017, the entire content of which is incorporated herein by reference.

TECHNICAL FIELD

The present disclosure relates to a lens unit and a manufacturing method of a metal mold. Specifically, the present disclosure relates to a lens unit including a plurality of lenses and a tube-shaped holder holding the lenses, and a manufacturing method of a metal mold which is used to manufacture the lens unit.

BACKGROUND

In a recent camera market, demand of an on-vehicle sensing camera, a high pixel monitoring camera and the like has increased and a further small and high-performance camera has been demanded. Further, a lens unit having high performance which is used in the camera has been required.

In a case that a tube-shaped holder which holds a lens (hereinafter, referred to as a "lens-barrel") is made of plastic, injection molding is commonly utilized. When a circular lens-barrel (inner peripheral face) is to be formed, distortion is occurred by a flow of resin at the time of molding and its outer shape and, as a result, the inner peripheral face may be difficult to be circular and may be formed in an elliptical shape. In order to prevent this problem, a plurality of ribs is formed on the inner peripheral face and a height of each of the ribs is adjusted. As a result, the centers of the lenses are easily aligned at the time of assembling and working of a metal mold component can be simply performed. Various techniques regarding this structure have been proposed (see, for example, Japanese Patent Laid-Open No. 2016-18182 (Patent Literature 1)).

In the technique disclosed in Patent Literature 1, a plurality of alignment protruded parts (rib) formed on a tube part of a lens-barrel in a circumferential direction includes a first alignment protruded part and a second alignment protruded part whose protruding amount is different from that of the first alignment protruded part. Appropriate alignment can be attained by determining an imaginary circle corresponding to an outer periphery of a lens by using two types of alignment protruded parts having different protruding amounts (first and second alignment protruded parts).

On the other hand, an arrangement position of a gate in a lens-barrel is restricted by a demand for further miniaturization, designation of a supported portion by a cover case, designation of a threaded portion and the like. Further, recently, an integrated article of a lens-barrel and a cover case has been required. As a result, in either a single lens-barrel or an integrated article of a lens-barrel and a cover case, distortion due to a resin flow at the time of molding and distortion due to its outer shape are further easily occurred and thus the inner peripheral face is further deformed (ellipse becomes larger). Therefore, a new technique has been required. Specifically, an ellipse of an inner peripheral face becomes larger, adjustment of protruding amounts of the ribs becomes difficult. In other words, an advanced working for a metal mold component is required because circularity is secured by a plurality of ribs and heights (protruding amount) of the libs are set so as to be capable of being lightly press-fitted.

SUMMARY

In view of the problem described above, the present disclosure provides a technique which is capable of restraining misalignment of respective lenses due to distortion of a holder by respective protruded parts even when distortion due to a flow of resin at the time of molding and an outer shape of the holder is easily occurred in the holder. Further, in another aspect, the present disclosure simplifies working of a metal mold component used for molding the holder.

To achieve the above mentioned technical contents, the present disclosure provides a lens unit, including: a plurality of lenses; and a holder in a tube shape, which holds the plurality of the lenses. An inner peripheral face of the holder is formed with a plurality of alignment protruded parts protruded from the inner peripheral face to an inner side in a circumferential direction, each of the alignment protruded parts is provided with a first alignment protruded part whose protruding dimension is different and a second alignment protruded part, and the second alignment protruded part is protruded from the first alignment protruded part to the inner side of the inner peripheral face to be abutted with an outer peripheral face of one of the lenses.

According to this structure, even in a case that distortion is easily occurred in the holder due to a flow of resin at the time of molding and the outer shape of the holder, misalignment of each lens due to distortion of the holder can be restrained by the respective protruded parts. Further, since a two-stage structure of the first alignment protruded part and the second alignment protruded part is adopted, working of a metal mold component for molding the holder can be simplified.

According to an embodiment of the disclosure, the second alignment protruded part is formed in a rib shape.

When formed in a rib shape, working of a metal mold component is easy.

According to an embodiment of the disclosure, the first alignment protruded part comprises a flat face.

A concentric circle corresponding to the outer peripheral face of a lens which is press-fitted to the lens-barrel is determined by a plurality of the first alignment protruded parts and correction for circularity is easily performed by forming the first alignment protruded parts which are a plurality of flat face parts. In other words, the first alignment protruded part is a flat face part and thus, when a metal mold for manufacturing is worked and modified, the reference is easily determined and accuracy is easily enhanced.

According to an embodiment of the disclosure, the first alignment protruded part and the second alignment protruded part are respectively formed in a rib shape whose cross section is a curved surface, and the shapes of the first alignment protruded part and the second alignment protruded part satisfy the following conditional expression;

$$2 \times \text{``}R2\text{''} \leq \text{``}R1\text{''}$$

"R1": a curvature radius of the first alignment protruded part, and

"R2": a curvature radius of the second alignment protruded part.

When the shapes of the first alignment protruded part and the second alignment protruded part are set to satisfy the above-mentioned conditional expression, even in a case that both shapes are formed in rib shapes, the concentric circle determined by the first alignment protruded parts can be comparatively easily attained with a desired degree of accuracy.

According to an embodiment of the disclosure, at least one of the lenses held by a tube part of the holder is made of a plastic lens and an outer peripheral face of the plastic lens is provided with a gate cut part and the alignment protruded parts are formed at twelve or more positions.

When the alignment protruded parts are provided at twelve or more positions, even in a case that the lens which is press-fitted is provided with a gate cut part (shape like a so-called "D"-cut part) and the alignment protruded part is not abutted in the portion, a sufficient aligning function can be obtained by the remaining alignment protruded parts.

According to an embodiment of the disclosure, protruding amounts of a plurality of the first alignment protruded parts are different from each other so that imaginary points located at positions protruded to the most inner side in the plurality of the first alignment protruded parts become an imaginary circle with an optical axis as a center when the imaginary points are connected with each other.

According to an embodiment of the disclosure, protruding amounts of a plurality of the second alignment protruded parts are the same as each other.

According to an embodiment of the disclosure, an outer peripheral face of the lens is provided with a circumferential face, and the imaginary circle in the plurality of the first alignment protruded parts has the same diameter as a diameter of the circumferential face of the lens.

The present disclosure provides a manufacturing method of a metal mold which is used to manufacture the above-mentioned lens unit. The manufacturing method includes: a first face forming process, in which a flat face is formed at a plurality of positions at equal intervals in the circumferential direction on an outer peripheral face of a cylindrical-shaped metal mold component corresponding to the inner peripheral face of the holder; and a second face forming process, in which a second face is formed from the flat face to an inner side in a concave-shaped face. And, a plurality of the flat faces which are formed in the first face forming process is included in a concentric circle corresponding to an outer peripheral face of one of the lenses.

The flat part which is a flat face is formed in a cylindrical-shaped metal mold component which is the lens-barrel metal mold in the above-mentioned processes and thus the reference is easily determined and working is easy, and a desired imaginary concentric circle can be easily obtained. In other words, in a case that positioning of an imaginary concentric circle of a lens and a lightly press-fitting structure are realized only by simple ribs to perform correction for circularity, adjustment for enhancing accuracy is difficult and it may take a longer time. However, according to this embodiment, adjustment for enhancing accuracy is easy and adjustment time can be largely reduced.

Other features and advantages of the disclosure will be apparent from the following detailed description, taken in conjunction with the accompanying drawings that illustrate, by way of example, various features of embodiments of the disclosure.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

An embodiment for performing the disclosure (hereinafter, referred to an "embodiment") will be described below with reference to the accompanying drawings.

Figure 1:
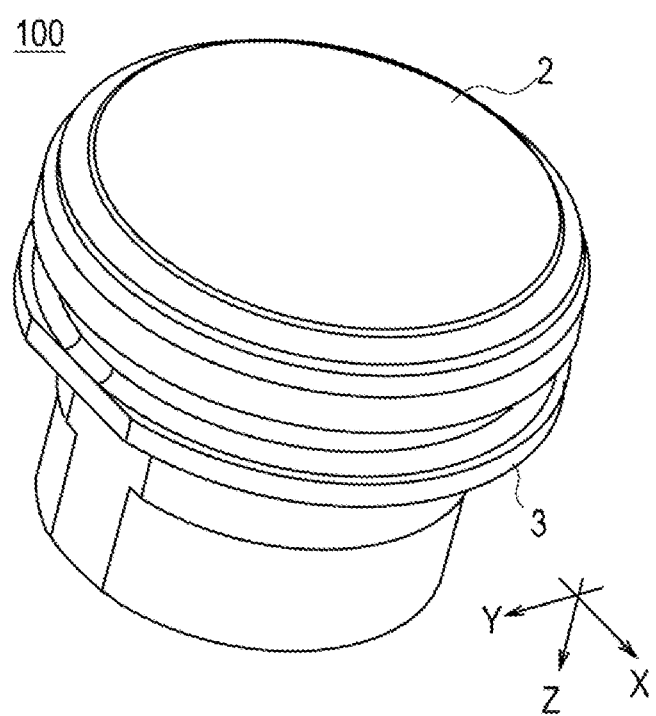
FIG. 1 is a perspective view showing a lens unit in accordance with an embodiment of the present disclosure.
Figure 2:
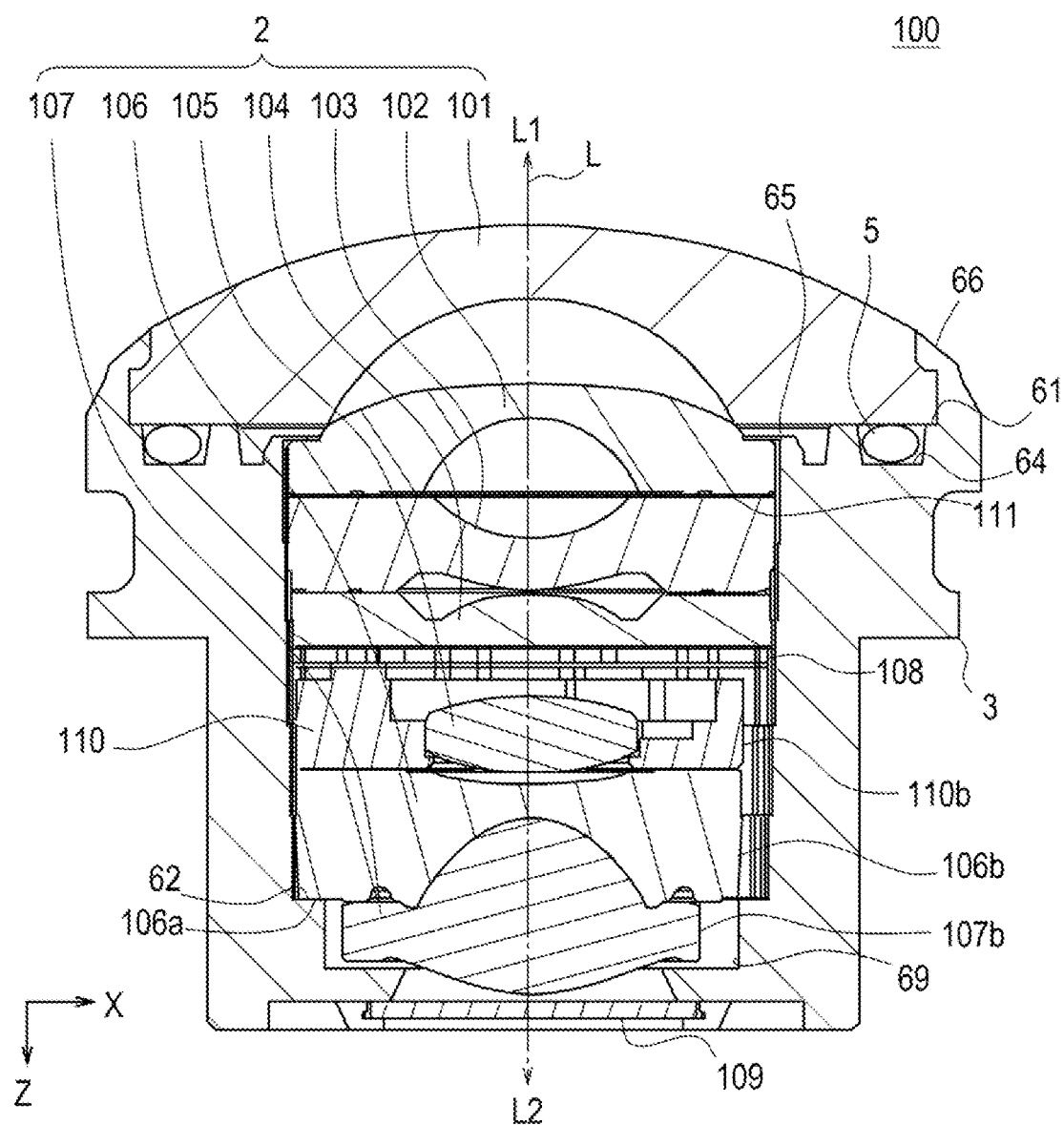
FIG. 2 is a longitudinal cross-sectional view showing the entire lens unit in accordance with an embodiment of the present disclosure.

FIG. 1 is a perspective view showing a lens unit 100 in accordance an embodiment. FIG. 2 is a longitudinal cross-sectional view ("X-Z" cross-sectional view) showing the entire lens unit 100 in accordance with an embodiment. The lens unit 100 is a lens assembly which is assembled into an on-vehicle periphery monitoring camera, a monitoring camera, a doorphone or the like. An "object side "L1"" and an "image side "L2"" in the present disclosure are an object side and an image side in an optical axis "L" direction and an "optical axis direction" is a direction parallel to an optical axis "L". Further, the "−"-direction side of the "Z"-axis of the "XYZ"-axes directions in the drawing corresponds to the object side "L1", and the "+"-direction side of the "Z"-axis corresponds to the image side "L2".

(Entire Structure)

The lens unit 100 includes a wide-angle lens 2 constituted of a plurality of lenses and a lens-barrel 3 which is a holder in which the wide-angle lens 2 is accommodated.

The wide-angle lens 2 is constituted of seven lenses, i.e., a first lens 101, a second lens 102, a third lens 103, a fourth lens 104, a fifth lens 105, a sixth lens 106 and a seventh lens 107, which are disposed from the object side "L1" to the image side "L2" along the optical axis "L" so as to be in tight contact manner.

In this embodiment, a light shielding sheet 111 which prevents light from entering to the image side is disposed so as to be in tight contact state between the second lens 102 and the third lens 103. Further, a diaphragm 108 is disposed so as to be in tight contact state between the fourth lens 104 and the fifth lens 105 (glass lens holder 110). In addition, an infrared ray cut filter 109 is attached to an opening on the image side "L2" of the lens-barrel 3 so as to face the seventh lens 107.

In the lenses constituting the wide-angle lens 2, the first lens 101 is disposed on the most object side "L1". The second lens 102 is located on the image side "L2" of the first lens 101. The third lens 103 is located on the image side "L2" of the second lens 102. The fourth lens 104 is located on the image side "L2" of the third lens 103. The fifth lens 105 is located on the image side "L2" of the fourth lens 104. The fifth lens 105 is press-fitted and fixed to the lens holder 110 made of resin in a reinforced fixing state with an adhesive and is disposed in the lens-barrel 3. The sixth lens 106 is located on the image side "L2" of the fifth lens 105. The seventh lens 107 is located on the image side "L2" of the sixth lens 106. The sixth lens 106 and the seventh lens 107 are a cemented lens made of plastic (resin), and gate cut parts 106*b* and 107*b* (also referred to as a "D"-cut part) are provided at a position corresponding to a gate port of a metal mold when formed by injection molding. Specifically, the gate cut parts 106*b* and 107*b* are provided on side faces of flange parts of the respective lenses. Further, although not shown, a similar gate cut part is provided on each of the second lens 102, the third lens 103 and the fourth lens 104 which are plastic lenses. Further, a similar gate cut part 110*b* is also provided on the lens holder 110 made of resin which holds the fifth lens 105.

A glass lens is used as the first lens 101 from a viewpoint that an object side lens face of the first lens 101 is hard to be scratched even in a case that the object side lens face is exposed outside. Plastic lenses are used as the second lens 102, the third lens 103, the fourth lens 104, the sixth lens 106 and the seventh lens 107 from a viewpoint that workability and economical efficiency of a lens are excellent. A glass lens is used as the fifth lens 105 from a viewpoint that optical characteristics such as surface accuracy of a lens and a refractive index to temperature change are excellent.

In this embodiment, the wide-angle lens 2 of the lens unit 100 is constituted of seven lenses. However, the number of the lenses is not limited to seven and material of the lens is not limited to the material in the above-mentioned embodiment.

Figure 3A:
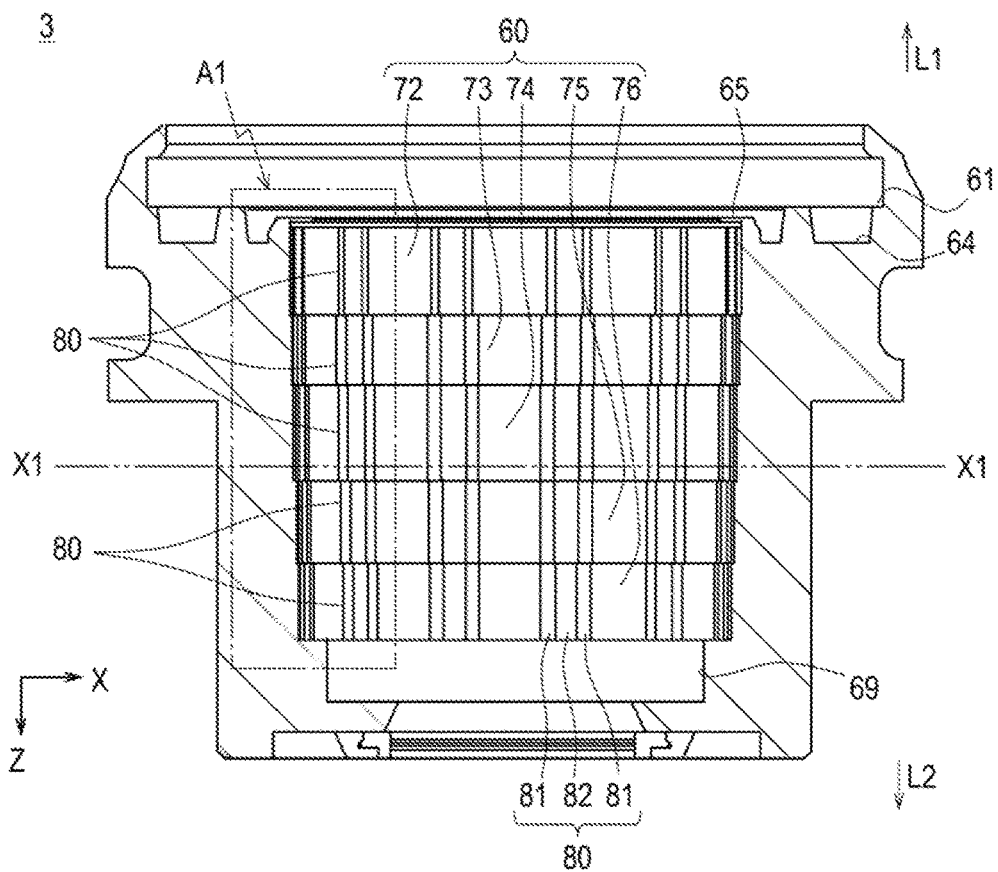
FIGS. 3A and 3B are cross-sectional views showing a lens-barrel in accordance with an embodiment of the present disclosure.
Figure 3B:
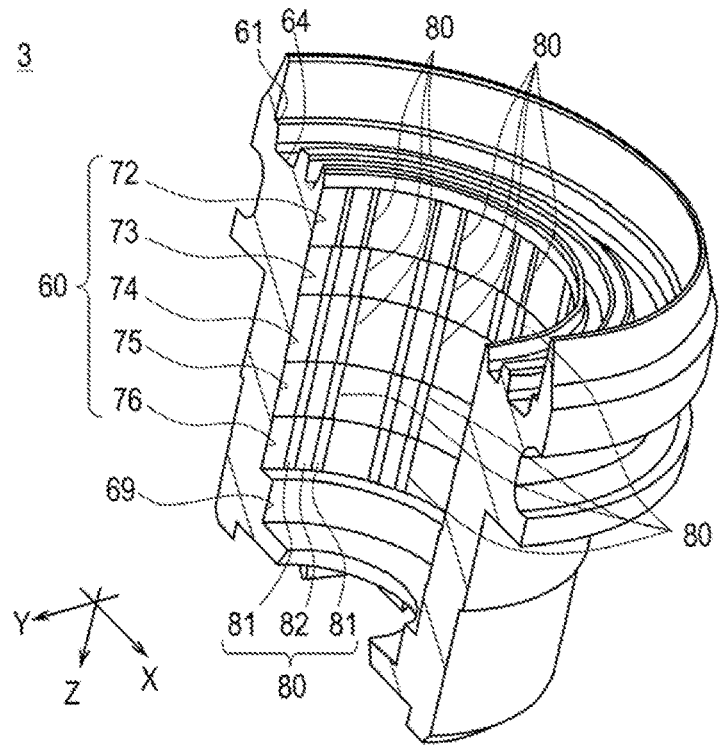

FIGS. 3A and 3B are cross-sectional views showing the lens-barrel 3. FIG. 3A is a longitudinal cross-sectional view ("X-Z" cross-sectional view) and FIG. 3B is a cross-sectional perspective view. The lens-barrel 3 is a lens frame in a cylindrical tube shape made of resin and is formed with an inner peripheral face 60 toward the image side "L2" along outer peripheral faces of the respective lenses constituting the wide-angle lens 2. A seventh lens accommodation part 69 whose diameter is smaller than that of the inner peripheral face 60 and in which the seventh lens 107 is accommodated is formed on the image side "L2" with respect to the inner peripheral face 60.

A plurality of alignment protruded parts 80 in a convex-shape is formed on the inner peripheral face 60 at equal intervals in a circumferential direction so as to protrude in a convex shape (swelled shape) to an inner side in a radial direction. The second lens 102, the third lens 103, the fourth lens 104, the lens holder 110 (fifth lens 105) and the sixth lens 106 in the lenses constituting the wide-angle lens 2 are press-fitted (commonly, lightly press-fitted) to the alignment protruded parts 80 and, in addition, the outer peripheral faces of the lenses are supported by the inner peripheral face 60 of the lens-barrel 3 and thereby the lenses are positioned in the radial direction. In other words, the alignment protruded parts 80 function as a press-fitting holding part for the second lens 102, the third lens 103, the fourth lens 104, the lens holder 110 (fifth lens 105) and the sixth lens 106. The alignment protruded part 80 has a two-stage structure formed of a first alignment protruded part 81 and a second alignment protruded part 82 which will be described in detail below.

Further, a flat part 106*a* formed in a periphery of a face on the image side "L2" of the sixth lens 106 (peripheral region of a flange outer peripheral face on the image side) is placed on a ring-shaped flat part 62 which is extended to an inner side in the circumferential direction on the image side "L2" of the lens-barrel 3 (placed on a step part in a boundary between the inner peripheral face 60 and the seventh lens accommodation part 69). On the other hand, the seventh lens 107 is set in a non-contact state with the lens-barrel 3.

Further, a flat part formed in a periphery of a face on the image side "L2" of the lens holder 110 is placed on a flat part formed in a periphery of a face on the object side "L1" of the sixth lens 106. Further, a flat part formed in a periphery of a face on the image side "L2" of the fourth lens is placed on a flat part formed in a periphery of a face on the object side "L1" of the lens holder 110 through the diaphragm 108. Further, a flat part formed in a periphery of a face on the image side "L2" of the third lens is placed on a flat part formed in a periphery of a face on the object side "L1" of the fourth lens 104. Further, a flat part formed in a periphery of a face on the image side "L2" of the second lens is placed on a flat part formed in a periphery of a face on the object side "L1" of the third lens 103 through the light shielding sheet 111. Further, a periphery of a face on the object side "L1" of the second lens 102 is fixed by a caulking part 65 provided at an end part on the object side of the inner peripheral face of the lens-barrel 3.

In this manner, the second lens 102, the third lens 103, the fourth lens 104, the lens holder 110 (fifth lens 105) and the sixth lens 106 are positioned in the optical axis "L" direction.

In addition, after an O-ring 5 is placed on a ring-shaped groove part 64 formed on a face on the object side "L1" of the lens-barrel 3, the first lens 101 is placed on the O-ring 5 and is pressed to the image side "L2" to set in a state that the first lens 101 is placed on a lens arrangement face 61. In this state, a periphery of the first lens 101 is fixed by a caulking part 66 provided at an end part on the object side of the lens-barrel 3 and the first lens 101 is positioned in the optical axis "L" direction.

In this embodiment, from a viewpoint of preventing an error of inserting order of the second lens 102, the third lens 103, the fourth lens 104, the lens holder 110 (fifth lens 105) and the sixth lens 106, an outer diameter of each of the lenses on the image side "L2" is set to be smaller with respect to an adjacent lens on the object side "L1" and, in addition, the inner peripheral face 60 becomes successively narrower so as to correspond to the outer diameters of the respective lenses.

(Alignment Protruded Part of Lens-barrel)

Figure 4:
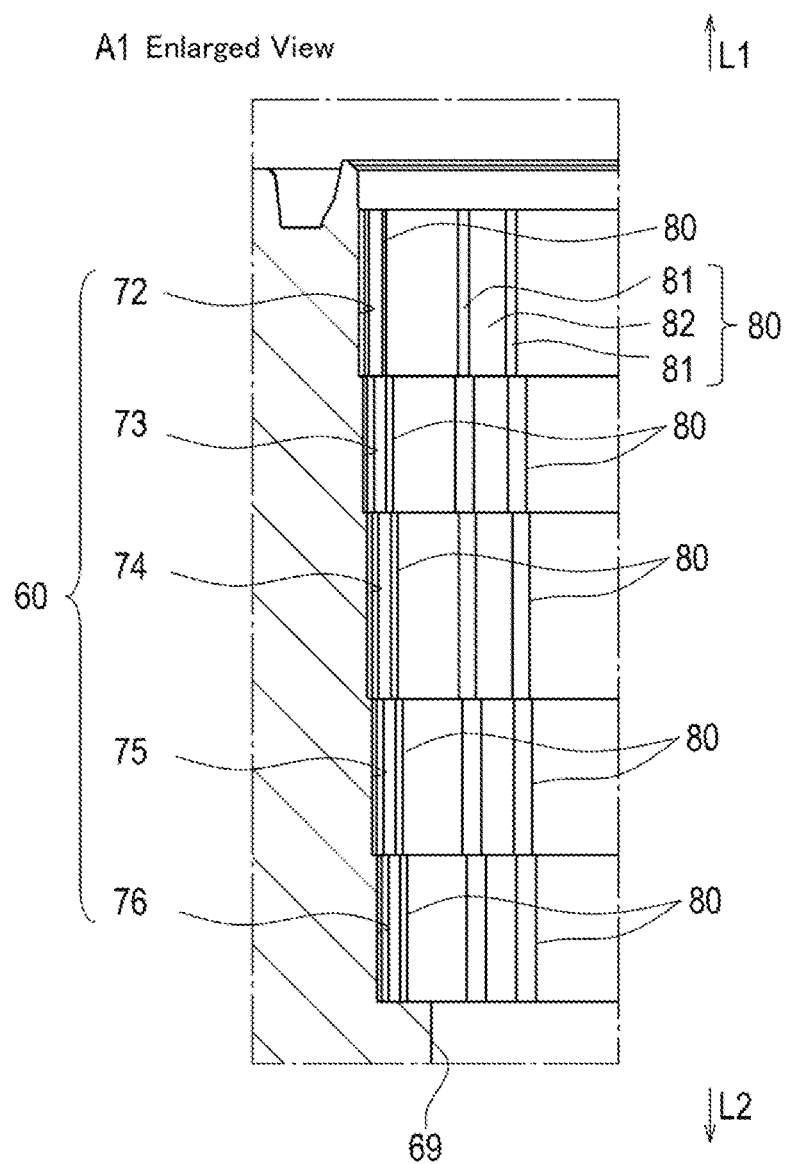
FIG. 4 is an enlarged view showing the region "A1" in FIG. 3A in accordance with an embodiment of the present disclosure.
Figure 5:
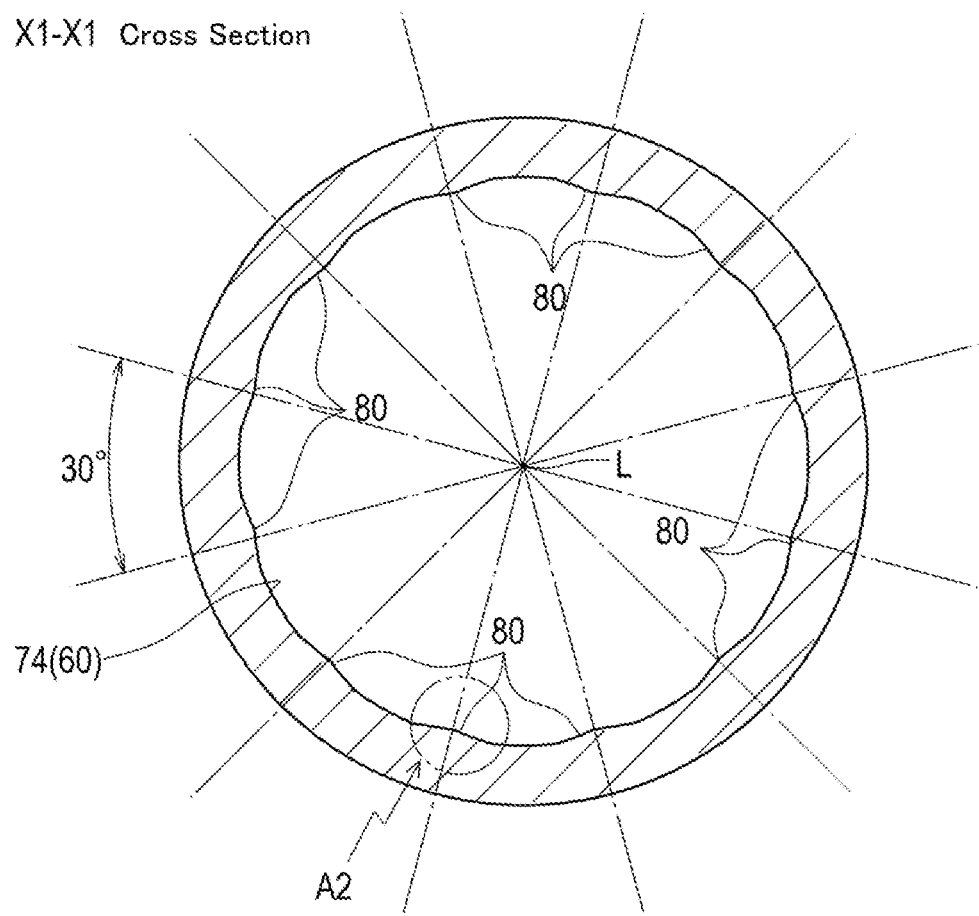
FIG. 5 is an "X1-X1" cross-sectional view in FIG. 3A in accordance with an embodiment of the present disclosure.
Figure 6A:
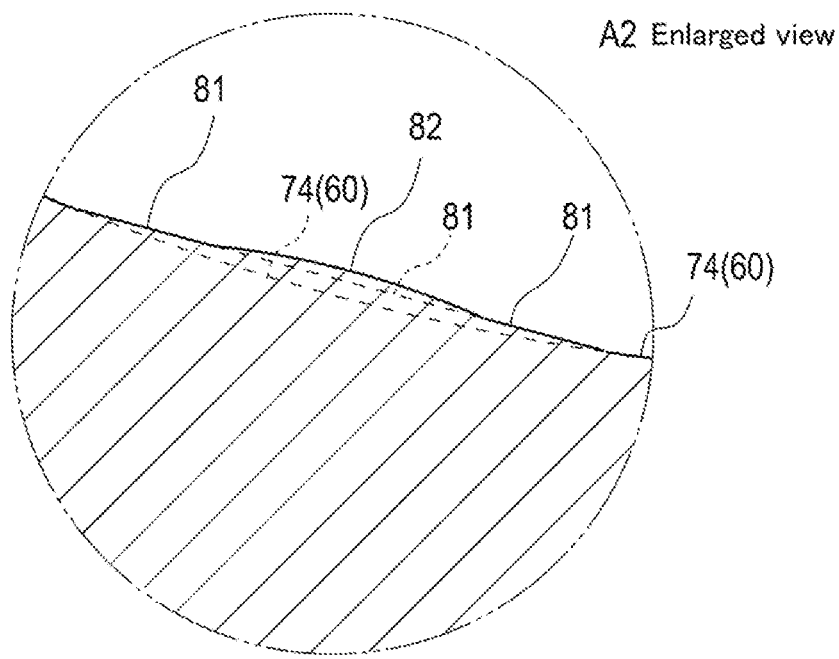
FIGS. 6A and 6B are enlarged views showing the region "A2" in FIG. 5 in accordance with an embodiment of the present disclosure.
Figure 6B:
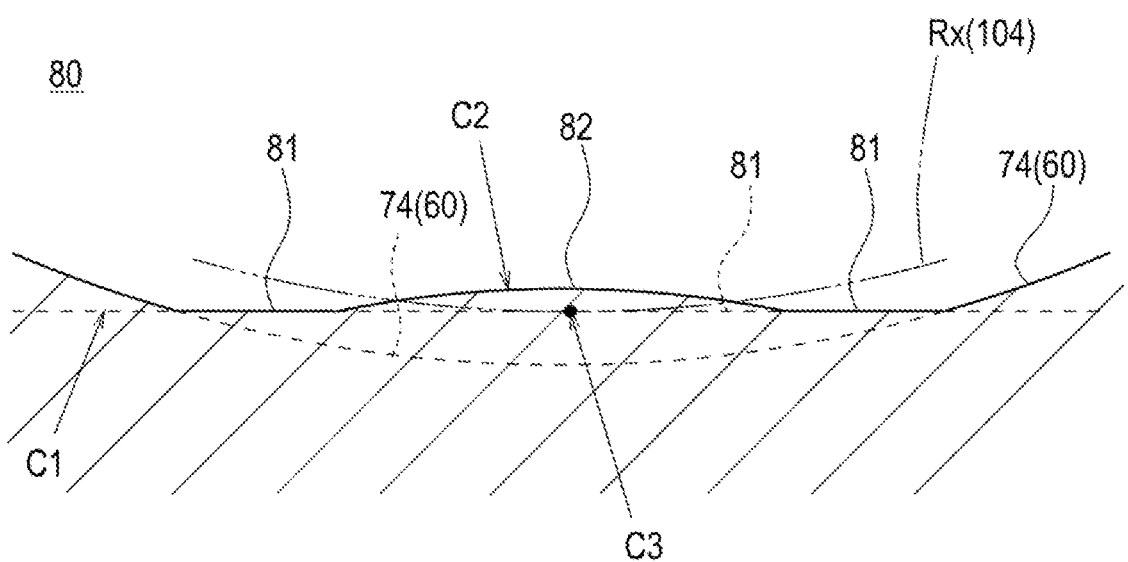

Next, a specific structure of the alignment protruded part 80 formed on the inner peripheral face 60 will be described below with reference to FIGS. 3A through 6B. FIG. 4 is an enlarged view showing the region "A1" in FIG. 3A. FIG. 5 is an "X1-X1" cross-sectional view in FIG. 3A. FIGS. 6A and 6B are enlarged views showing the region "A2" in FIG. 5. FIG. 6B schematically shows a cross-sectional structure in FIG. 6A.

The inner peripheral face 60 is provided from the object side "L1" to the image side "L2" (for example, from the upper side to the lower side in FIG. 4) with a second lens accommodation part 72 in a cylindrical tube shape in which the second lens 102 is accommodated, a third lens accommodation part 73 in a cylindrical tube shape in which the third lens 103 is accommodated, a fourth lens accommodation part 74 in a cylindrical tube shape in which the fourth lens 104 is accommodated, a fifth lens accommodation part 75 in a cylindrical tube shape in which the glass lens holder 110 holding the fifth lens 105 is accommodated, and a sixth lens accommodation part 76 in a cylindrical tube shape in which the sixth lens 106 is accommodated.

The second through the sixth lens accommodation parts 72 through 76 are formed so that an outer shape of the second lens accommodation part 72 on the object side "L1" is the largest and the respective outer shapes become gradually smaller toward the image side "L2" so as to correspond to the outer shapes of the respective lenses.

The second through the sixth lens accommodation parts 72 through 76 are respectively provided with the alignment protruded parts 80 at equal intervals in a circumferential direction. As shown in FIG. 5, in this embodiment, twelve alignment protruded parts 80 are provided at the interval of 30 degrees. In a case that the gate cut parts 106b and 107b are provided in the sixth lens 106 and the seventh lens 107, when the alignment protruded parts 80 are provided at twelve or more positions, even in a case that the alignment protruded parts 80 are not abutted with the gate cut parts 106b and 107b, a sufficient aligning function can be operated by the remaining alignment protruded parts 80.

The alignment protruded part 80 is provided with a first alignment protruded part 81 which is protruded (bulged) to an inner side from the inner peripheral face 60 and a second alignment protruded part 82 protruded to the inner side from the first alignment protruded part 81. In this embodiment, the second alignment protruded part 82 is formed so as to be interposed between the two first alignment protruded parts 81 in the right and left direction. As described above, the alignment protruded part 80 has a two-stage protruding structure in which protruding amounts from the inner peripheral face 60 are different from each other.

In each of the cases that the alignment protruded parts 80 are formed in the second through the sixth lens accommodation parts 72 through 76, a person skilled in the art can easily arrive at modification of the alignment protruded part 80 depending on a structure and a shape of an accommodated lens and manufacturing processes of a metal mold component for the lens-barrel 3 although the basic structure is the same. Next, the alignment protruded part 80 formed in the fourth lens accommodation part 74 which accommodates the fourth lens 104 will be described below as an example with reference to the "X1-X1" cross section in FIG. 5 and the enlarged views in FIGS. 6A and 6B.

The alignment protruded part 80 will be further specifically described below with reference to FIGS. 6A and 6B. The two first alignment protruded parts 81 are protruded from the fourth lens accommodation part 74 (inner peripheral face 60) formed in a circular arc shape to an inner side and are formed on the same flat face "C1".

In addition, the first alignment protruded part 81 formed in the flat face "C1" is formed with the second alignment protruded part 82 whose cross section is a curved surface "C2". In other words, the second alignment protruded part 82 is protruded as a longitudinal bulging-shaped rib which is extended in parallel to the optical axis "L" direction. The fourth lens 104 is press-fitted and firmly held by the second alignment protruded parts 82.

In this embodiment, the first alignment protruded part 81 is formed so as to be the flat face "C1". In this case, the twelve first alignment protruded parts 81 formed in a circumferential direction, more specifically, twelve positions "C3" protruded to the most inside of the flat faces "C1" are located on a concentric circle "Rx" with the optical axis "L" as a center, in other words, on the outer periphery of the fourth lens 104. In this case, the protruding amounts of the first alignment protruded parts 81 which are a plurality of flat face parts may be respectively different from each other for aligning to the target concentric circle "Rx". Further, the concentric circle "Rx" is not always required to be located on the outer periphery of the fourth lens 104 and, for example, an imaginary circle which is separated from the outer periphery of the fourth lens 104 by a gap space of about several microns may be set as the concentric circle "Rx".

In this embodiment, protruding amounts of a plurality of the first alignment protruded parts 81 are different so that, when the twelve positions "C3" respectively protruded to the most inside in a plurality of the first alignment protruded parts 81 are set to be imaginary points and the imaginary points are connected with each other, an imaginary circle (concentric circle "Rx") is obtained with the optical axis "L" as a center. Further, the outer peripheral face of the fourth lens 104 is provided with a circumferential face and the imaginary circle (concentric circle "Rx") formed by the plurality of the first alignment protruded parts 81 has the same diameter as that of the circumferential face of the fourth lens.

As described above, when the first alignment protruded parts 81 which are a plurality of flat face parts are formed so as to become the target concentric circle "Rx", correction for circularity is easily performed. In other words, since the first alignment protruded part 81 is a flat face part (flat face "C1"), a reference is easily determined when a manufacturing metal mold is to be manufactured or modified and a high degree of accuracy is easily attained.

In the embodiment described above, the first alignment protruded part 81 is formed to be the flat face "C1". However, the present disclosure is not limited to this shape and, for example, the first alignment protruded part 81 may be formed in a rib shape whose cross section is a curved surface which is similar to the second alignment protruded part 82. In this case, it is desirable that the shapes of the first alignment protruded part 81 and the second alignment protruded part 82 satisfy the conditional expression (1) and the first alignment protruded part 81 is formed to be a sufficiently gradual curved surface with respect to the second alignment protruded part 82.

$$2\times \text{"}R2\text{"} \leq \text{"}R1\text{"} \qquad \text{conditional expression (1)}$$

"R1": a curvature radius of the first alignment protruded part 81, and

"R2": a curvature radius of the second alignment protruded part 82

When the shapes of the first alignment protruded part 81 and the second alignment protruded part 82 are set to satisfy the conditional expression (1), even in a case that both shapes are formed in a rib shape, the position "C" of the first alignment protruded part 81 which makes the concentric circle "Rx" can be comparatively easily determined with a desired degree of accuracy.

(Regarding Metal Mold)

Figure 7A:
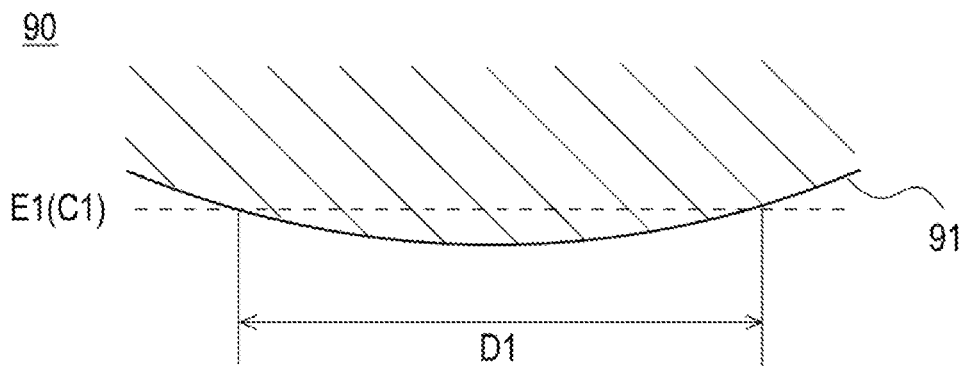
FIGS. 7A, 7B and 7C are views showing manufacturing processes of a metal mold in accordance with an embodiment of the present disclosure.

Next, with reference to FIG. 7A, FIG. 7B and FIG. 7C, a metal mold will be described below which is used when the lens-barrel 3 is manufactured by injection molding. Especially, a lens-barrel metal mold 90 corresponding to the inner peripheral face 60 and the alignment protruded parts 80 formed on it will be described below. The lens-barrel metal mold 90 is a metal mold component in a columnar shape (or cylindrical tube shape) whose cross section is circular. The lens-barrel metal mold 90 is disposed in an inside of another metal mold component having a columnar hollow part, and resin is introduced by injection into a space between an inner peripheral face and an outer peripheral face of the lens-barrel metal mold 90 (inner peripheral face forming surface 91 for the inner peripheral face 60) to make the inner peripheral face 60.

Figure 7B:
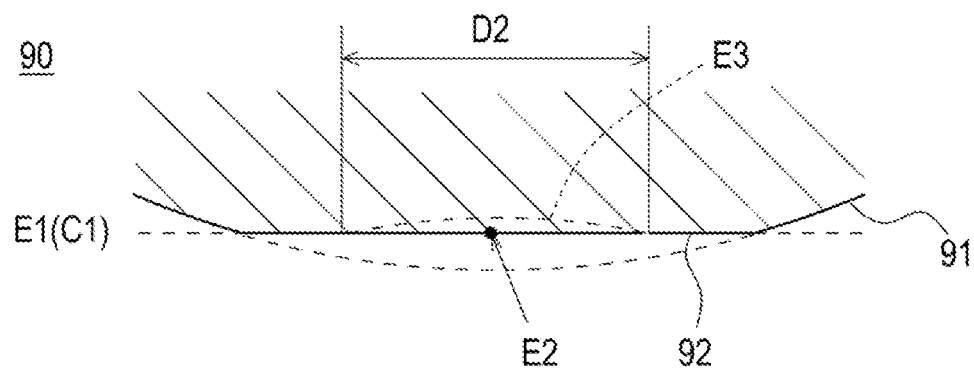
Figure 7C:
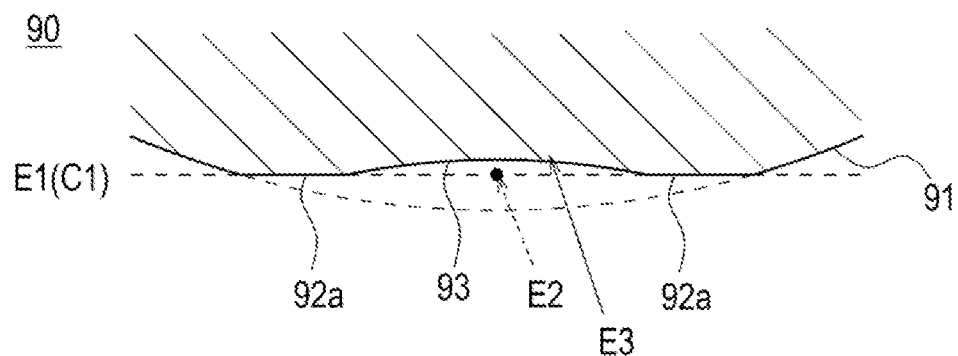

In this embodiment, as a metal mold shape for forming the alignment protruded part 80 of the inner peripheral face 60, the lens-barrel metal mold 90 is, as shown in FIG. 7C, provided with a flat part 92 corresponding to the flat face "C1" of the first alignment protruded part 81 and a concave curved face 93 corresponding to the second alignment protruded part 82.

First, a lens-barrel 3 is manufactured by injection molding in a state that the lens-barrel metal mold 90 is not formed with a shape corresponding to the alignment protruded part 80 (concave curved face 93 and flat part 92a). As a result, a lens-barrel 3 (inner peripheral face 60) is molded which is not provided with the alignment protruded part 80 (first alignment protruded part 81 and second alignment protruded part 82). In this state, circularity of the inner peripheral face 60 is measured and analyzed. In other words, as shown in FIG. 7A, a region "D1" which is to be cut in a flat face "E1" in the inner peripheral face forming surface 91 is determined. The region "D1" which is cut, in other words, a protruding amount of the first alignment protruded part 81 corresponding to the region "D1" may be different according to its position in a circumferential direction.

Next, the region "D1" is cut and, as shown in FIG. 7B, the flat part 92 is formed in the inner peripheral face forming surface 91. The center portion "E2" which has been cut is located on the imaginary concentric circle of a target lens (in FIG. 6B, outer periphery of the fourth lens 104, in other words, corresponding to the concentric circle "Rx"). The flat part 92 is formed at a predetermined number of positions at equal intervals in the circumferential direction, in the embodiment described above, twelve flat parts 92, i.e., twelve center portions "E2" are formed at intervals of 30 degrees.

Next, as shown in FIG. 7C, a concave curved face 93 in a longitudinal bulging shape whose cross section is a partial arc "E3" is formed in a center portion of the flat part 92 in a longitudinal direction. As a result, the flat part 92 is divided into two flat parts 92a so that the concave curved face 93 is interposed therebetween. The concave curved face 93 corresponds to the second alignment protruded part 82. In this case, it is desirable that a depth of the concave curved face 93, in other words, a protruding amount of the second alignment protruded part 82 used for lightly press-fitting is the same in all of the second alignment protruded parts 82.

Since the flat part 92 formed of a flat face is formed in the lens-barrel metal mold 90 according to the above-mentioned processes, the reference is easily determined and working is easily performed and a desired imaginary concentric circle is easily obtained. In other words, in a case of correction for circularity in which positioning of an imaginary concentric circle of a lens and a structure of lightly press-fitting are realized only by simple ribs, adjustment for enhancing accuracy is difficult and takes a longer time. However, according to this embodiment, adjustment for enhancing accuracy is easy and adjustment time can be largely reduced.

(Features and Effects of Embodiment)

The lens unit 100 in this embodiment includes a plurality of lenses (second lens 102 through seventh lens 107) and a tube-shaped holder (lens-barrel 3) which holds the plurality of the lenses. In the lens unit 100, a plurality of the alignment protruded parts 80 protruded to an inner side (direction toward the optical axis "L") from the inner peripheral face 60 is formed on the inner peripheral face 60 of the holder (lens-barrel 3) in a circumferential direction. Each of the alignment protruded part 80 is provided with the first alignment protruded part 81 whose protruding dimension is different and the second alignment protruded part 82, and the second alignment protruded part 82 is protruded from the first alignment protruded part 81 to an inner side of the inner peripheral face 60 and is abutted with the outer peripheral face of the lens.

According to this structure, even in a case that distortion is easily occurred due to flow of resin at the time of molding and the outer shape of the holder (lens-barrel 3), misalignment of each lens due to distortion of the holder (lens-barrel 3) can be restrained by the respective alignment protruded parts 80. Further, since a two-stage structure of the first alignment protruded part 81 and the second alignment protruded part 82 is adopted, working of a metal mold component (lens-barrel metal mold 90) can be simplified when the holder (lens-barrel 3) is molded.

According to an embodiment of the disclosure, the second alignment protruded part 82 is formed in a rib shape.

When formed in a rib shape, working of a metal mold component (lens-barrel metal mold 90) is easy.

According to an embodiment of the disclosure, the first alignment protruded part 81 is formed in a flat face.

A concentric circle corresponding to the outer peripheral face of a lens which is press-fitted to the lens-barrel 3 is determined by a plurality of the first alignment protruded parts 81 and correction for circularity is easily performed by forming the first alignment protruded parts 81 which are a plurality of flat face parts. In other words, the first alignment protruded part 81 is a flat face part and thus, when a manufacturing metal mold (lens-barrel metal mold 90) is to be manufactured and modified, the reference is easily determined and enhancing accuracy is easy.

According to an embodiment of the disclosure, the first alignment protruded part 81 and the second alignment protruded part 82 are respectively formed in a rib shape whose cross section is a curved surface, and the shapes of the first alignment protruded part 81 and the second alignment protruded part 82 satisfy the following conditional expression;

$$2 \times \text{"R2"} \leq \text{"R1"}$$

"R1": a curvature radius of the first alignment protruded part, and

"R2": a curvature radius of the second alignment protruded part.

When the shapes of the first alignment protruded part 81 and the second alignment protruded part 82 are set to satisfy the above-mentioned conditional expression, even in a case that both shapes are formed in a rib shape, the concentric circle determined by the first alignment protruded parts can be comparatively easily attained with a desired degree of accuracy.

According to an embodiment of the disclosure, at least one of the lenses held by a tube part of the holder (lens-barrel 3) is made of a plastic lens (sixth lens 106 and seventh lens 107) and an outer peripheral face of the plastic lens is provided with the gate cut parts 106b and 107b and the alignment protruded parts 80 are formed at twelve or more positions.

When the alignment protruded parts are provided at twelve or more positions, even in a case that the lens which is press-fitted is provided with a gate cut part and the alignment protruded part 80 is not abutted with the portion, a sufficient aligning function can be obtained by the remaining alignment protruded parts 80.

The present disclosure provides a manufacturing method of a metal mold by which the above-mentioned lens unit 100 is manufactured. The manufacturing method includes: a first face forming process, in which a flat face (flat part 92) is formed at a plurality of positions at equal intervals in a circumferential direction on an outer peripheral face of a cylindrical-shaped metal mold component (lens-barrel metal mold 90) corresponding to the inner peripheral face 60 of the holder(lens-barrel 3); and a second face forming process, in which a second face is formed from the flat face to an inner side in a concave-shaped face (concave curved face 93), and a plurality of the flat faces (flat part 92) which are formed in the first face forming process is included in a concentric circle corresponding to an outer peripheral face of one of the lenses.

The flat part 92 comprised of a flat face is formed in a cylindrical-shaped metal mold component which is the lens-barrel metal mold 90 in the above-mentioned processes and thus the reference is easily determined and working is easy, and a desired imaginary concentric circle can be easily obtained. In other words, in a case of correction for circularity in which positioning of an imaginary concentric circle of a lens and a structure of lightly press-fitting are realized only by simple ribs, adjustment for enhancing accuracy is difficult and takes a longer time. However, according to this embodiment, adjustment for enhancing accuracy is easy and adjustment time can be largely reduced.

While the description above refers to particular embodiments of the present disclosure, it will be understood that many modifications may be made without departing from the spirit thereof. The accompanying claims are intended to cover such modifications as would fall within the true scope and spirit of the present disclosure.

The presently disclosed embodiments are therefore to be considered in all respects as illustrative and not restrictive, the scope of the disclosure being indicated by the appended claims, rather than the foregoing description, and all changes which come within the meaning and range of equivalency of the claims are therefore intended to be embraced therein.

What is claimed is:

1. A lens unit, comprising:
a plurality of lenses; and
a holder in a tube shape, which holds the plurality of the lenses;
wherein
an inner peripheral face of the holder is formed with a plurality of alignment protruded parts protruded from the inner peripheral face to an inner side in a circumferential direction;
each of the alignment protruded parts comprises: a first alignment protruded part whose protruding dimension is different and a second alignment protruded part; and
the second alignment protruded part is protruded from the first alignment protruded part to the inner side of the inner peripheral face to be abutted with an outer peripheral face of one of the lenses.

2. The lens unit according to claim 1, wherein
the second alignment protruded part is formed in a rib shape.

3. The lens unit according to claim 1, wherein
the first alignment protruded part comprises a flat face.

4. The lens unit according to claim 2, wherein
each of the first alignment protruded part and the second alignment protruded part is formed in a rib shape whose cross section is a curved surface,
shapes of the first alignment protruded part and the second alignment protruded part satisfy a following conditional expression:

$2 \times \text{``}R2\text{''} \leq \text{``}R1\text{''}$

"R1": a curvature radius of the first alignment protruded part, and
"R2": a curvature radius of the second alignment protruded part.

5. The lens unit according to claim 1, wherein
at least one of the lenses which are held by a tube part of the holder is a plastic lens,
an outer peripheral face of the plastic lens is provided with a gate cut part, and
the alignment protruded part is formed at twelve or more positions.

6. The lens unit according to claim 1, wherein
the first alignment protruded part comprises a flat face, and
the second alignment protruded part is formed in a rib shape.

7. The lens unit according to claim 6, wherein
protruding amounts of a plurality of the first alignment protruded parts are different from each other, so that imaginary points located at positions protruded to a most inner side in the plurality of the first alignment protruded parts become an imaginary circle with an optical axis as a center when the imaginary points are connected with each other.

8. The lens unit according to claim 7, wherein
protruding amounts of a plurality of the second alignment protruded parts are same as each other.

9. The lens unit according to claim 8, wherein
an outer peripheral face of the lens comprises a circumferential face, and
the imaginary circle in the plurality of the first alignment protruded parts has a same diameter as a diameter of the circumferential face of the lens.

10. A manufacturing method of a metal mold which is used to manufacture the lens unit defined in claim 1, the manufacturing method comprising:
a first face forming process, in which a flat face is formed at a plurality of positions at equal intervals in the circumferential direction on an outer peripheral face of a cylindrical-shaped metal mold component corresponding to the inner peripheral face of the holder; and
a second face forming process, in which a second face is formed from the flat face to an inner side in a concave-shaped face;
wherein
a plurality of the flat faces which are formed in the first face forming process is included in a concentric circle corresponding to an outer peripheral face of one of the lenses.

* * * * *